Feb. 18, 1969   O. C. NIEDERER   3,428,161
EGG FEEDING MEANS
Filed Oct. 17, 1966
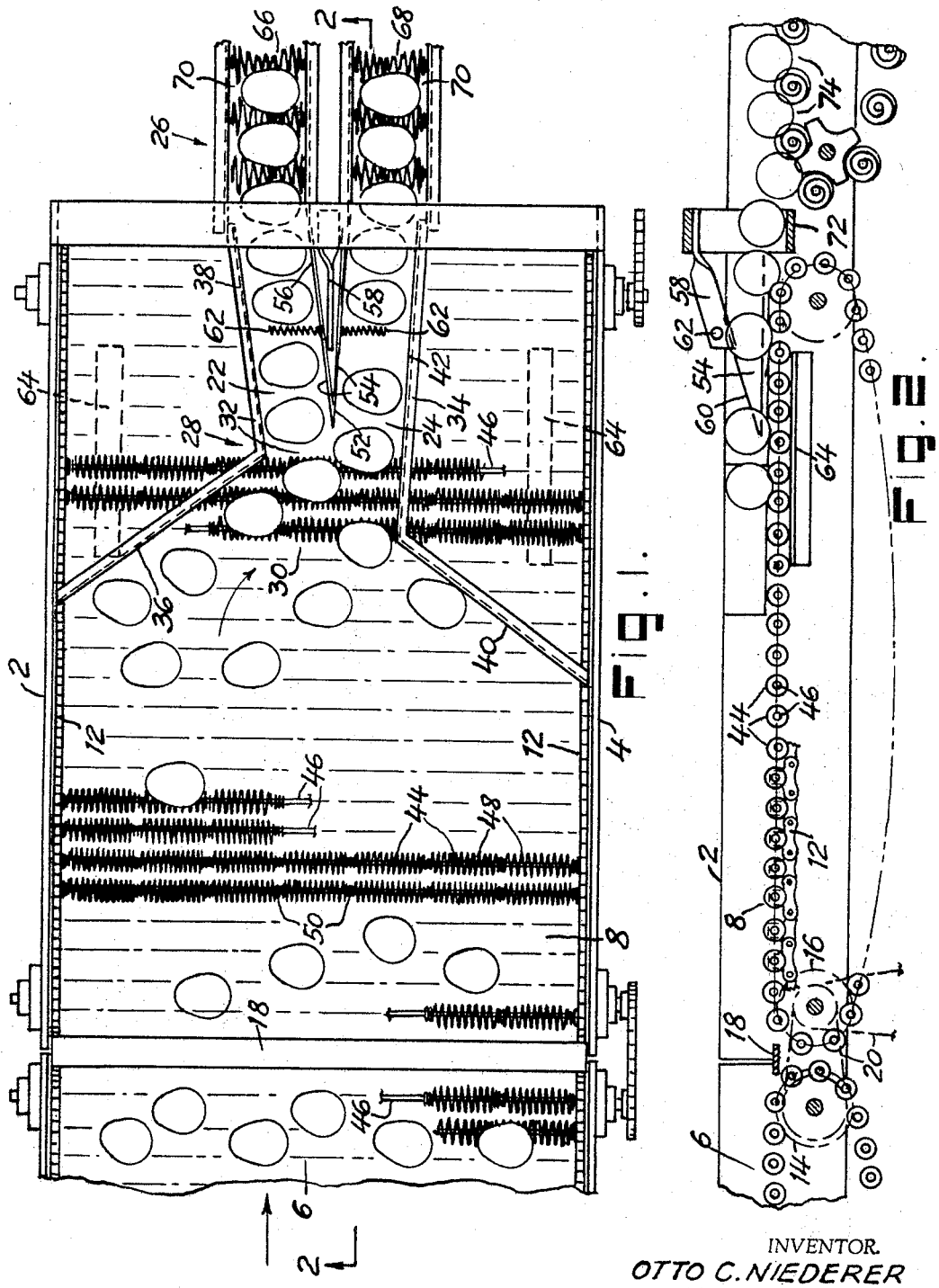
INVENTOR.
OTTO C. NIEDERER
BY Sperry and Zoda
ATTORNEYS

United States Patent Office 3,428,161
Patented Feb. 18, 1969

3,428,161
EGG FEEDING MEANS
Otto C. Niederer, Bear Tavern Road,
Titusville, N.J. 08560
Filed Oct. 17, 1966, Ser. No. 587,267
U.S. Cl. 198—30
Int. Cl. B65g 47/26
5 Claims

ABSTRACT OF THE DISCLOSURE

Equipment for arranging eggs supplied in random fashion into a plurality of orderly rows of eggs wherein the eggs are supported on a conveyor provided with rotatable members over which the eggs may roll freely into and out of engagement with deflecting members located at different points lengthwise of the conveyor. The deflecting members tend to cause the eggs to move in a circular path when they accumulate adjacent the entrance to the channels in which they are to assume an orderly arrangement. Dividers are located between the channels adjacent the entrances thereof and yieldable means are mounted on the dividers to prevent any eggs which may ride up on the eggs entering the channels from remaining in a raised position.

---

This invention relates to egg handling equipment and is directed particularly to means for moving eggs from a random arrangement into parallel rows for candling or other purposes.

It is well known that eggs tend to roll about irregularly on a surface with the result that they frequently interfere with each other or jam together when they are to be fed into a limited or predetermined number of individual channels or passages. Thus for example, difficulties are encountered when eggs are received in groups from a vacuum egg lifter or are received in a random manner from a washer or other equipment and are thereafter to be fed in an orderly manner to channels in an egg candler or the like. These difficulties are, to a large degree, increased when rubber or canvas belts or other conventional conveyors are used in advancing the eggs toward an outlet since the eggs then are frictionally urged toward the outlet and the force exerted upon the eggs is increased whenever they accumulate adjacent the outlet.

In accordance with the present invention these objections and limitations inherent in constructions of the prior art are overcome and means are provided whereby eggs are gently and effectively moved to and through one or more outlets or channels in a manner which serves to reduce or eliminate the tendency for the eggs to interfere with each other or to cause clogging or jamming thereof adjacent an outlet. In the preferred embodiment of the invention herein shown and described, egg feeding means are provided which serve to decrease the pressure or drag which the conveyor imposes on the eggs at points where they may interfere or accumulate, as for example, at points adjacent the entrance to one or more channels where jamming or clogging tends to take place. At the same time, novel egg deflecting means are employed in combination with such egg feeding means to assure controlled movement of eggs into a desired orderly arrangement into one or more channels.

Accordingly the principal objects of the present invention are to facilitate the movement of eggs into and through an outlet; to decrease the frictional drag or pressure exerted upon eggs at those points where they tend to collect and interfere with desired movement thereof; and to provide improved egg handling equipment whereby eggs may be received in a random arrangement and fed in an orderly manner to and through an outlet or passage.

These and other objects and features of the present invention will appear from the following description thereof wherein reference is made to the figures of the accompanying drawings.

In the drawings:

FIG. 1 is a top plan view of a typical form of egg feeding and arranging means embodying the present invention; and FIG. 2 is a longitudinal sectional view of the construction shown in FIG. 1 taken on the line 2—2 thereof.

In that form of the invention chosen for purposes of illustration in the drawing, the equipment is provided with a frame having side members 2 and 4 along which conveyors 6 and 8 are movable. Each of the conveyors 6 and 8 is preferably of the type shown and described in copending application Ser. No. 584,581 and embodies chains 12 which pass about sprockets 14 and 16. The conveyor 6 may be considered an egg receiving conveyor upon which groups of eggs are deposited by vacuum egg lifters or to which eggs may be supplied from an egg washer or any other source, whereas the conveyor 8 may be advanced more rapidly than the conveyor 6 to serve as an egg spacing or separating means. A cover plate 18 is located between the adjacent ends of the conveyors 6 and 8 where they pass about the sprockets 14 and 16 to permit the eggs to move readily from one conveyor to the other. The sprockets and conveyors may, of course, be driven at the desired speeds by any suitable form of driving means such as the belts 20 or the like.

In this way, the upper run of the egg receiving conveyor 6 is advanced toward the right as seen in FIG. 1 for moving groups of eggs deposited thereon toward the egg spacing conveyor 8. The eggs then move over the cover plate 18 where they are advanced more rapidly than they are received so as to increase the spacing between the eggs. The spacing conveyor 8 serves to advance the eggs toward an outlet or one or more channels such as the channels 22 and 24 through which the eggs are moved in single file and in an orderly manner to an egg candler or the like indicated at 26.

In order to direct the eggs advanced by the spacing conveyor 8 into the channels 22 and 24 in an orderly manner, egg deflecting means 28 are located adjacent the entrance to the channels 22 and 24 and above the conveyor 8. The deflecting means 28 serves to direct the eggs into a common passage 30 where they are divided into rows for movement in single file through the channels 22 and 24. The egg deflecting means preferably embody a plate 32 located above and adjacent the conveyor 8 and presenting a vertical inner face for engagement with the eggs. As shown, the plate 32 is located on the outer side of the channel 22 and a generally similar plate 34 is located on the outer side of the channel 24 above the conveyor 8. The plate 32 has a portion 36 inclined horizontally inwardly from the side frame member 2 inwardly toward the channel 22 and at its inner end is provided with a channel forming portion 38 which defines one side of the common passage 30. The plate 34 is similarly provided with an inwardly inclined portion 40 and a channel forming portion 42 which defines the opposite side of the common passage 30. However, the inclined portion 36 of the plate 32 is located in advance of the inclined portion 40 of the plate 34 whereby these portions are offset longitudinally of the conveyor 8. In this way, it is possible to prevent the eggs from being moved directly inward toward each other immediately adjacent the throat or entrance to the common passage 30. The eggs are instead caused to move in a generally arcuate path as indicated by the arrow so that whenever an accumulation of eggs occurs at this point, they will tend to circulate about near the entrance instead of being pushed together into a clogged or jammed relation.

Further as shown in FIG. 2, the conveyor 8 is preferably formed with a plurality of coiled spring elements 44 which surround transversely extending rods 46 carried by the chains 12 of the conveyor 8. The coiled spring elements 44 embody egg engaging portions 48 of relatively large diameter and composed of turns of wire which are spaced apart to permit relative movement and yielding contact with the eggs. Bearing portions 50 of the coiled spring elements are of relatively smaller diameter and rotatably engage the rods 46 while holding the elements in horizontal positions with the yieldable egg engaging portions 48 thereof cooperating to provide a cushioned surface for supporting the eggs and over which the eggs are readily movable.

The coiled spring elements 44 are freely rotatable with respect to the rods 46 throughout that portion of the conveyor 8 in advance of the throat or entrance to the common passage 30. Therefore, if any accumulation of eggs should occur at this point so as to retard their forward movement into the passage 30, the coiled spring elements are free to rotate in a counter-clockwise direction as seen in FIG. 2. As a result, the eggs are not positively urged forward and no drag or thrust is applied to the eggs as the conveyor 8 continues to advance. The eggs, instead, are freely movable relative to each other and with respect to the conveyor so that they can shift about and are prevented from jamming together in a manner which will tend to clog the entrance to the common passage 30. Damage or checking of the eggs and any tendency for them to pile up adjacent the common passage 30 is thus avoided.

As shown in FIG. 1, wherein the passage 30 serves to supply eggs to two channels 22 and 24, a central divider 52 is located within the passage 30 and presents inclined sides 54 which have parallel extensions 56 that cooperate with the channel forming portions 38 and 42 of the plates 32 and 34 to define the opposite sides of the channels 22 and 24. Furthermore, in order to prevent any eggs from being pushed up and onto other eggs in the channels 22 and 24, a central ejecting member 58 having an inclined leading edge 60, is located between the inclined sides 54 of the divider. In addition, a yieldable spring member 62 projects transversely from the ejector member 58 above the channels 22 and 24 so as to prevent any eggs from remaining in a raised position as they move through the channels 22 and 24. The spring member 62 may extend across the entire width of the channels 22 and 24 if desired.

In order to assure more positive movement of the eggs through the channels 22 and 24 after they have been arranged in single file therein, friction members 64 are located beneath the upper run of the conveyor 8 in position to engage the enlarged egg engaging portions 48 of the coiled spring elements 44 to prevent free or counter-clockwise rotation of the elements. As shown the friction members 64 extend from a point adjacent the central divider 52 between the channels 22 and 24 to a point adjacent the discharge end of the conveyor 8 where the eggs are transferred to conveyors 70 of the egg candler or other egg handling device 26, which may be of the type shown and described in U.S. Patent No. 3,148,761. The friction member, by engagement with the coiled spring elements 44, serves to cause said elements to rotate in a clockwise direction as seen in FIG. 2 as the conveyor advances. This rotation of the elements 44 aids in assuring the positive advancing and spacing of the eggs within the channels 22 and 24 for delivery of the eggs from the equipment in two parallel rows as shown at 66 and 68 in FIG. 1. Furthermore, such clockwise rotation of the elements 44 serves to cause the eggs to assume positions within the channels 22 and 24 wherein the long axis of each egg extends transversely of the channel whereby they will be discharged across a plate 72 into egg receiving cavities 74 in the conveyors 70. The eggs then are thereby arranged in an orderly manner for candling thereof or for performing such other operations by the device 26 as may be desired.

The cushioned and yielding support and movement of the eggs and the absence of positive forward thrust on the eggs by the conveyor when the eggs accumulate in the throat of the passage 30, serves to enable the eggs to shift and move about relatively freely. The positioning and delivery of the eggs for movement into the channels 22 and 24 therefor takes place very readily and without the attendant blocking and crowding of the eggs in the entrance to the passage 30. Moreover, the handling of the eggs is of such a gentle character than even when the eggs are thin shelled or have been checked or slightly cracked they can be arranged in an orderly manner without damage or further injury thereto.

It will of course be apparent that equipment embodying the present invention may be employed for arranging eggs in an orderly manner in a single channel or row or in any desired number of rows, depending upon the nature of the equipment to which the eggs are to be supplied. Therefore, it should be understood that the particular embodiment of the invention shown in the drawings and described above is intended to be illustrative only and is not intended to limit the scope of the invention.

I claim:

1. Egg feeding equipment for moving eggs which may be in random arrangement on a conveyor into predetermined arrangement in at least one channel, comprising a conveyor for receiving the eggs to be arranged, channel forming means toward which said conveyor is movable, egg deflecting means located above said conveyor in position to be engaged by eggs supported on said conveyor, said deflecting means being inclined inwardly from opposite sides of the conveyor toward said channel forming means, the egg deflecting means inclined inwardly from one side of the conveyor being displaced longitudinally of the conveyor with respect to the egg deflecting means inclined inwardly from the opposite side of the conveyor to cause accumulations of eggs adjacent the entrance to the channel formed by said channel forming means to be moved transversely of the conveyor to relieve such accumulations, and yieldable means extending transversely of said channels above the eggs therein to prevent any eggs which may ride up onto the eggs entering the channels from remaining in such a raised position.

2. Egg feeding equipment as defined in claim 1 wherein said conveyor embodies transversely extending rods with egg supporting means thereon rotatable with respect to said rods to relieve the thrust exerted on said eggs by said conveyor as the conveyor advances beneath an accumulation of eggs adjacent the entrance to said channel.

3. Egg feeding equipment as defined in claim 2 wherein said conveyor moves beyond the entrance to the channel formed by said channel forming means, and said egg supporting means are positively rotated during their movement beyond the entrance to said channel.

4. Egg feeding equipment as defined in claim 2 wherein said egg supporting means comprise coiled spring members.

5. Egg feeding means as defined in claim 1 wherein a divider is located between said channel forming means to define two adjacent channels to which eggs are supplied by said conveyor, and said yieldable means is mounted on said divider.

References Cited

UNITED STATES PATENTS

| | | | |
|---|---|---|---|
| 2,775,334 | 12/1956 | Jeremiah | 198—30 |
| 1,160,792 | 11/1915 | Van Houten | 198—76 |
| 2,953,234 | 9/1960 | Abendschein | 198—30 |
| 3,148,761 | 9/1964 | Niederer et al. | 198—34 X |
| 3,279,580 | 10/1966 | Englander et al. | 198—76 X |

RICHARD E. AEGERTER, *Primary Examiner.*